United States Patent [19]

Sato et al.

[11] Patent Number: 4,480,404

[45] Date of Patent: Nov. 6, 1984

[54] LOCKING APPARATUS FOR A DETACHABLE SUNSHADE OF VEHICLES

[75] Inventors: Mikio Sato, Toyoake; Asao Ogasawara, Hekinan; Keiji Mori, Toyota, all of Japan

[73] Assignee: Aisin Seki Kabushiki Kaisha, Kariya, Japan

[21] Appl. No.: 355,307

[22] Filed: Mar. 5, 1982

[30] Foreign Application Priority Data

Mar. 17, 1981 [JP] Japan .................................. 56-37095

[51] Int. Cl.³ .............................................. E05B 65/04
[52] U.S. Cl. .......................................... 49/62; 49/465; 292/150; 292/173
[58] Field of Search .......................... 49/62, 463, 465; 296/214, 218, 224; 292/150, 359, 173

[56] References Cited

U.S. PATENT DOCUMENTS 4,261,602 4/1981 Anderson ............................ 292/143
4,337,975 7/1982 Tamamushi et al. ............... 49/62 X Primary Examiner—Kenneth Downey
Attorney, Agent, or Firm—Oblon, Fisher, Spivak, McClelland & Maier

[57] ABSTRACT

A locking apparatus for a detachable sunshade for a vehicle which includes a detachable panel, a connecting pin, a sunshade detachably attached to an interior portion of the detachable panel and detachably engaged with the detachable panel at a rear portion thereof via the connecting pin, a shaft supported on the sunshade, an arm fixed to the connecting arm and the shaft, a locking handle pivotally supported on the sunshade and fixed to the shaft, a knob connected to the locking handle for rotating the locking handle and a torsion spring for biasing the connecting pin in a direction for engagement with the detachable panel.

19 Claims, 7 Drawing Figures

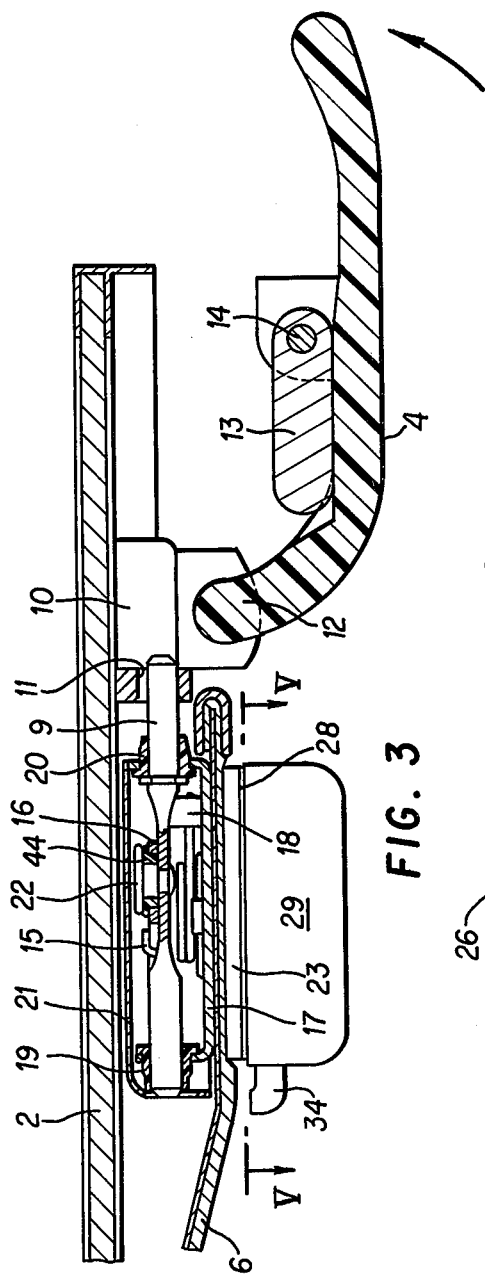
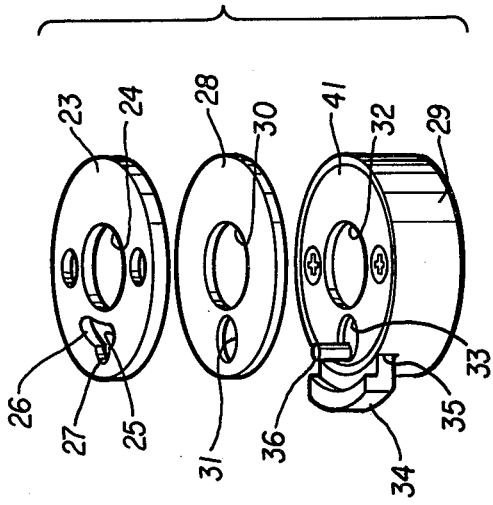

LOCKING APPARATUS FOR A DETACHABLE SUNSHADE OF VEHICLES

BACKGROUND OF THE INVENTION

1. Field of the Invention

The present invention relates to a locking apparatus of a detachable sunshade, and, more particularly, to a locking apparatus for a detachable sunshade of vehicles.

2. Description of the Prior Art

In a conventional locking apparatus for a detachable sunshade of vehicles which is attached so as to cover a detachable panel composed of a transparent board for opening and closing an opening of a vehicle roof from the interior thereof, locking operation of the sunshade and the detachable panel is attained by a connecting pin engaged with a naked handle. However, the handle must be rotated several times in order to release the locking state of the sunshade and the detachable panel and the sunshade drops by disconnecting the connecting pin when the handle is inadvertently rotated.

SUMMARY OF THE INVENTION

An object of the present invention is to provide an improved locking device for a detachable sunshade of vehicles which obviates the aforementioned drawbacks of the described conventional locking device for a detachable sunshade.

A further object of the present invention is to provide an improved locking device of a detachable sunshade of vehicles which can be reliably moved.

A still further object of this invention is to provide an improved locking apparatus for a detachable sunshade of vehicles which is relatively simple and includes a minimum number of parts.

BRIEF DESCRIPTION OF THE DRAWINGS

Various objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 3 is a view similar to FIG. 2 which shows a main enlarged portion of FIG. 2;

FIG. 4 is an exploded perspective view which shows a main portion of the locking apparatus according to the present invention;

DETAILED DESCRIPTION OF THE PREFERRED EMBODIMENT

Figure 1:
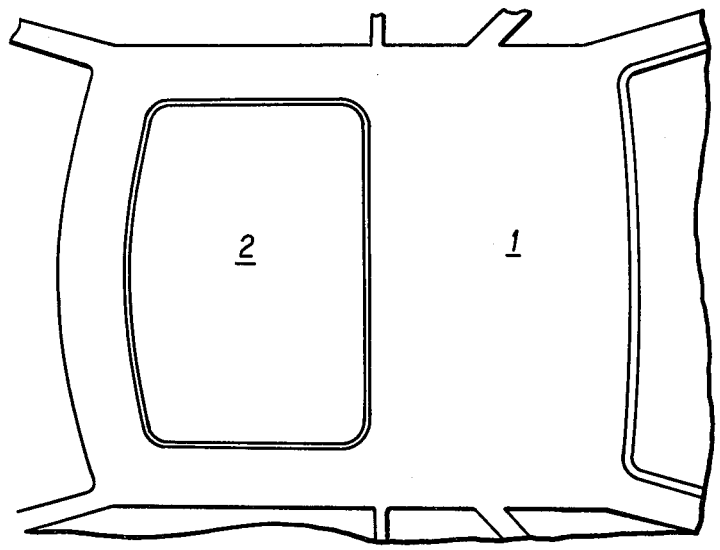
FIG. 1 is a top view of a vehicle roof which shows a detachable panel attached with a general sunshade.
Figure 2:
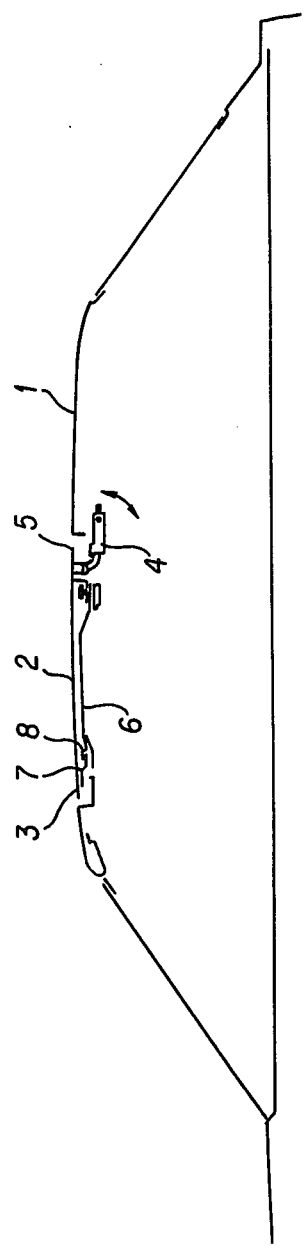
FIG. 2 is an elevational sectional view which shows a preferred embodiment of a locking device for a detachable sunshade of vehicles according to the present invention.

Referring now to FIG. 1 showing a top view of a vehicle body 1, a detachable panel 2 is mounted on a roof portion as shown in FIG. 2. Detachable panel 2 is made of a transparent board and can open or close the roof portion by upwardly and downwardly moving a rear end portion 5 of the detachable panel 2 about a front end 3 according to operation in the arrowed direction of tiltable handle 4.

Reference numeral 6 denotes a sunshade detachably mounted in an interior side of the detachable panel 2. A front portion of the sunshade 6 is engaged by a hanging plate 8 engaging with a supporting plate 7 attached to the detachable panel 2 and a rear portion thereof is engaged by being inserted into an hole 11 of a holder 10 attached by a connecting pin 9 to the detachable panel 2 (FIG. 3). Tiltable handle 4 is rotatably supported by a fulcrum 12 and by a pin 14 of a toggle link 13 fixed to the fixed roof.

Connecting pin 9 is biased in the direction for engaging with the hole 11 of the holder 10 by a torsion spring 15. One end of the torsion spring 15 is engaged with an arm 16 and the other end thereof is engaged with a flanged portion 18 of a bracket 17 (FIG. 3). Both ends of the connecting pin 9 are guided by guiding members 19, 20 fixedly inserted into both sides of the bracket 17. Reference numeral 21 denotes a cover. Connecting pin 9 and the arm 16 are connected to each other by a pin 22 which passes through a lost-motion slot in either the arm 16 or the connecting pin 9.

As shown in FIG. 4, a plate 23 is provided with a hole 24, a radial hole 25, a circumferential hole 26, and a slot 27 continued with the hole 26. Reference number 28 indicates a spacer located between a locking handle 29 and the plate 23 and is provided with a hole 30 and a radial slot 31. Sunshade 6 is therefore located between the plate 23 and the bracket 17. Locking handle 29 is provided with a hole 32 at a central portion of a cap 41, a radial slot 33, and a recess 35 for sliding a knob 34 at a lateral portion thereof. Radial hole 25 of the slot 27 of the plate 23, the radial slot 31 of the spacer 28 and the radial slot 33 of the locking handle 29 are located at corresponding portions respectively. Reference numeral 36 denotes a projection mounted on the knob 34 and is inserted into the radial slot 33 of the locking handle 29, the radial slot 31 of the spacer 28, and the radial hole 25 of the slot 27 of the plate 23.

Figure 5:
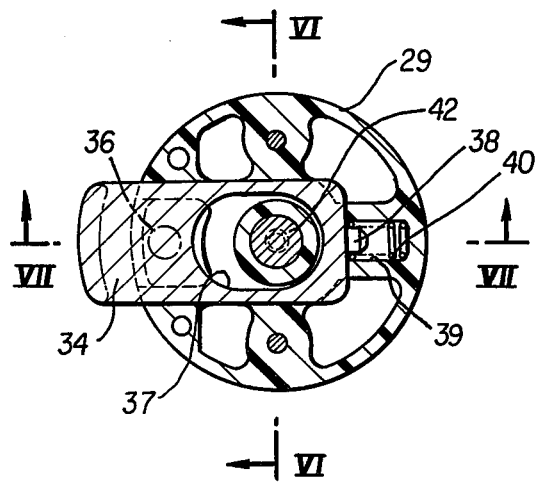
FIG. 5 is a sectional view taken along V—V in FIG. 3.
Figure 6:
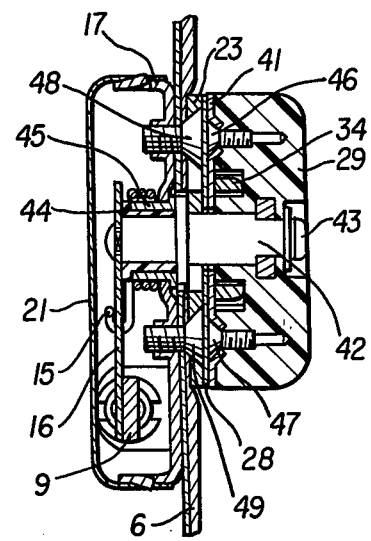
FIG. 6 is a similar view to FIG. 5, and which is taken along VI—VI in FIG. 5.
Figure 7:
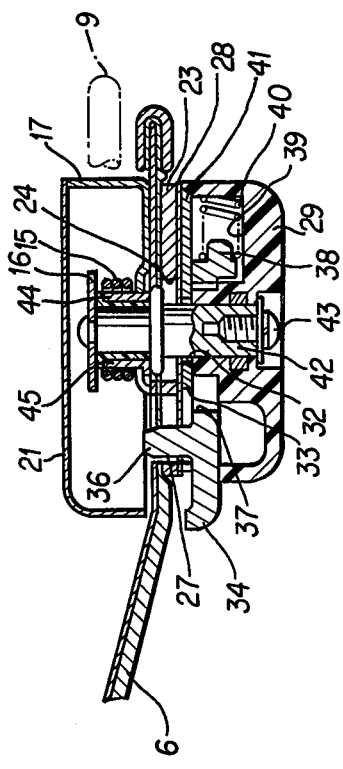
FIG. 7 is a similar view to FIG. 5, and which is taken along VII—VII in FIG. 5.

In FIGS. 5, 6, 7 knob 34 is provided with a slot 37 and a projecting portion 38. A spring 40 is interposed between a wall of a recessed portion 39 of the locking handle 29 and a right end of the knob for continuously leftwardly biasing the knob 34. Reference numeral 41 indicates a cap and 42 denotes a shaft. Shaft 42 is inserted through hole 32 in the cap 41 and the holes 30, 24 of the spacer 28 and the plate 23. Locking handle 29 and the shaft 42 are integrally fixed by a pin 43. Reference numeral 44 denotes a pin and 45 indicates a collar. Cap 41 is fixed to the locking handle 29 by screws 46, 47 and the plate 23 is fixed to the bracket 17 by screws 48, 49 through the sunshade 6.

Operation of the locking apparatus is as set forth hereinafter. Knob 34 of the locking handle 29 attached to a lower face of the sunshade 6 is depressed rightwardly against the biasing force of the spring 40 in FIG. 7 in order to remove the sunshade 6 from the vehicle interior. Therefore, the projection 36 of knob 34 is inwardly displaced from the state located outside of the radial slot 33 of the cap 41. Similarly the projection 36 of the knob 34 is also inwardly displaced from the state located outside of the radial slot 31 of the spacer 28 and the radial hole 25 of the slot 27 of the plate 23. Thereafter, when the locking handle 29 is rotated, the shaft 42 is rotated against the biasing force of the torsion spring 15. Accordingly, the rotational force of the shaft 42 releases the connecting pin 9 from the hole 11 of the holder 10 through the arm 16. At this time, the knob 34 is also rotated according to rotation of the locking handle 29 and the projection 36 of the knob 34 is displaced in the opposite circumferential direction to the radial hole 25 within the circumferential hole 26 of the slot 27 of the plate 23 (FIG. 4). Thereafter, the front portion of the sunshade 6 is released from the hanging plate 8 and the sunshade 6 can be removed from the detachable panel 2 (FIG. 2).

Next, when the sunshade 6 is attached to the detachable panel 2 after the sunshade 6 is removed form the detachable panel 2, the front portion of the sunshade 6 is hung on the hanging plate 8. As above mentioned in the operation discussion, the knob 34 is inwardly depressed and the locking handle 29 is rotated. Therefore, the connecting pin 9 is shifted leftwardly, namely in FIG. 3, displaced in the inward direction of the cover 21, and thereafter the connecting pin 9 is shifted toward the position of the hole 11 of the holder 10, thereby engaging the connecting pin 9 with the hole 11 of the holder 10 by the biasing force of the torsion spring 15 and returning the locking handle 29 to the nonoperating position through the shaft 42 (FIG. 7).

By the foregoing, there has been disclosed a prefered form of a locking apparatus of a detachable sunshade for vehicles constructed in accordance with the present invention. It will be appreciated that various additions, substitutions, modifications and omissions may be made thereto without departing from the spirit of the invention.

What is claimed as new and desired to be secured by Letters Patent of the United States is:

1. A locking apparatus for a detachable sunshade of a vehicle, comprising:
    a detachable panel;
    a connecting pin;
    a sunshade detachably attached to an interior portion of said detachable panel and detachably engaged with said detachable panel at a rear portion thereof via said connecting pin;
    a shaft supported on said sunshade;
    an arm operatively connected to said connecting pin and to said shaft;
    a locking handle pivotably supported on said sunshade and fixed to said shaft;
    a knob movably mounted on said locking handle and being movable between a first position where said sunshade is engaged therewith so as to fix said locking handle against said sunshade and a second position where said sunshade is disengaged therewith so as to allow the rotation of said locking handle; and
    spring means for biasing said connecting pin in a direction for engagement with said detachable panel.

2. A locking apparatus for a detachable sunshade of a vehicle as set forth in claim 1, wherein said locking handle has a hole, a radial slot and a recess formed therein within which said knob is slidable.

3. A locking apparatus for a detachable sunshade of a vehicle as set forth in claim 2, further comprising:
    a plate mounted on said sunshade and having a hole and a radial slot formed therein; and
    spacer means disposed between said locking handle and said plate and having a hole and a radial slot formed therein;
    said knob being slidably disposed in said radial slot of said plate through said radial slot of said spacer means so that said knob can move between said first position and said second position.

4. A locking apparatus for a detachable sunshade of a vehicle as set forth in claim 3, wherein said radial hole of said plate, said radial slot of said spacer, and said radial slot of said locking handle are located at corresponding positions in alignment.

5. A locking apparatus for a detachable sunshade of a vehicle as set forth in claim 4, wherein said knob further comprises a projection which is disposed within said radial slot of said locking handle, said radial slot of said spacer and said radial slot of said plate.

6. A locking apparatus for a detachable sunshade of a vehicle as set forth in claim 1, further comprising:
    spring means interposed between said locking handle and said knob for biasing said locking handle and said knob.

7. A locking apparatus for a detachable sunshade of a vehicle as set forth in claim 1, wherein said locking handle has a recess formed therein within which said knob is slidable.

8. A locking apparatus for a detachable sunshade of a vehicle as set forth in claim 7:
    wherein said locking handle has a radial slot and
    further comprising a plate mounted on said sunshade and having a radial slot with a circumferential hole formed therein;
    said knob being slidably disposed in said radial slots of said locking handle and said plate; and wherein, when said knob is positioned in said circumferential hole of said radial slot of said plate, said knob is rotatable.

9. A locking apparatus for a detachable sunshade of a vehicle as set forth in claim 8 and further comprising spring means interposed between said locking handle and said knob for biasing said knob towards said first position.

10. A locking apparatus for a detachable sunshade of a vehicle as set forth in claim 9, and further comprising:
    spacer means disposed between said locking handle and said plate, said spacer means having a radial slot formed therein, and
    a projection mounted on said knob and engaged with said radial slot of said plate through said radial slot of said spacer means.

11. A locking apparatus for a detachable sunshade of a vehicle as set forth in claim 1 wherein said spring means comprises a torsion spring.

12. In combination:
    (a) a roof panel mounted on a roof of a motor vehicle;
    (b) sunshade detachably mounted at one end on said roof panel;
    (c) a connecting pin mounted on said sunshade at the other end thereof for movement in a plane parallel to said roof panel, said connecting pin being received in a hole in said roof panel to detachably mount said sunshade on said roof panel at said other end of said sunshade;
    (d) spring means for biasing said connecting pin in a direction for engagement with said roof panel;
    (e) a shaft mounted for pivotal movement about an axis perpendicular to the plane in which said connecting pin moves;

(f) a locking handle pivotably mounted on said sunshade, said shaft being mounted in said locking handle;

(g) an arm operatively connected to said connecting pin and to said shaft;

(h) a knob mounted on said locking handle for movement between a first position in which it engages said sunshade, thereby preventing rotation of said locking handle, and a second position in which it is disengaged from said sunshade, thereby permitting rotation of said locking handle, whereby:

(i) movement of said knob from said first position to said second position followed by pivotal movement of said locking handle in one direction causes said connecting pin to move out of said hole in said roof panel against the biasing force of said spring means to permit said sunshade to be detached from said roof panel and (j) movement of said knob from said first position to said second position followed by pivotal movement of said locking handle in the other direction, the movement of said locking handle in said other direction being assisted by the biasing force of said spring means, causes said connecting pin to move into said hole in said roof panel to permit said sunshade to be reattached to said roof panel.

13. The combination of claim 12 wherein said locking handle has a hole through which said shaft protrudes, a recess through which said knob protrudes at right angles to said axis, and a radial slot through which a projection mounted on said knob protrudes in a direction parallel to said axis.

14. The combination of claim 13 wherein:

(a) said knob is longitudinally movable in said recess relative to said locking handle;

(b) said knob is biased towards said first position; and (c) said radial slot in said locking handle is sized and shaped to permit radial movement of said projection in said radial slot.

15. The combination of claim 14 and further comprising a plate disposed between said sunshade and said locking handle, said plate being rigidly affixed to said sunshade and having a hole into which said shaft protrudes and a 3-position slot into which said projection protrudes, said 3-position slot being sized and shaped to permit both radial movement of said projection as said knob is moved longitudinally between said first and second positions and circumferential movement of said projection as said knob and said locking handle are pivoted, but to permit circumferential movement of said projection only when said knob has been moved to said second position.

16. The combination of claim 15 and further comprising a spacer means disposed between said plate and said locking handle, said spacer means having a hole through which said shaft protrudes and a radial slot through which said projection protrudes, said slot being sized and shaped to permit both radial movement of said projection as said knob is moved longitudinally and circumferential movement of said projection as said knob and said locking handle are pivoted.

17. The combination of claim 16 wherein said locking handle is held against axial displacement relative to said sunshade by abutment means at each end of said shaft.

18. The combination of claim 16 and further comprising a bracket disposed on the opposite side of said sunshade from said locking handle, said plate, and said spacer means, said bracket being rigidly fixed to said sunshade and to said plate, said connecting pin being guided in its movement by said bracket.

19. The combination of claim 12 wherein said spring means is a torsion spring.

* * * * *

UNITED STATES PATENT AND TRADEMARK OFFICE
CERTIFICATE OF CORRECTION

PATENT NO. : 4,480,404
DATED : November 6, 1984
INVENTOR(S) : Sato et al.

It is certified that error appears in the above—identified patent and that said Letters Patent is hereby corrected as shown below:

In column 1, line 6, delete "1.";

In column 1, line 10, delete "2.";

In column 2, line 44, change "FIGS. 5, 6, 7" to -- FIGS. 5, 6 and 7, --;

In column 3, line 28, change "prefered" to -- preferred --.

Signed and Sealed this

Sixth Day of August 1985

[SEAL]

Attest:

DONALD J. QUIGG

Attesting Officer

Acting Commissioner of Patents and Trademarks